(12) United States Patent
Gamberini

(10) Patent No.: US 9,523,605 B2
(45) Date of Patent: Dec. 20, 2016

(54) APPARATUS FOR WEIGHING PHARMACEUTICAL PRODUCT CAPSULES

(71) Applicant: MG 2—S.r.l., Località Pian di Macina (IT)

(72) Inventor: Ernesto Gamberini, Rastignano (IT)

(73) Assignee: MG 2—S.R.L., Localita Pian di Macina (IT)

( * ) Notice: Subject to any disclaimer, the term of this patent is extended or adjusted under 35 U.S.C. 154(b) by 107 days.

(21) Appl. No.: 14/448,538

(22) Filed: Jul. 31, 2014

(65) Prior Publication Data

US 2015/0034397 A1 Feb. 5, 2015

(30) Foreign Application Priority Data

Aug. 1, 2013 (IT) .............................. BO2013A0430

(51) Int. Cl.
*G01G 17/00* (2006.01)
*G01G 15/00* (2006.01)
*A61J 3/07* (2006.01)
*G01G 23/37* (2006.01)

(52) U.S. Cl.
CPC ........... *G01G 23/3707* (2013.01); *A61J 3/074* (2013.01); *A61J 2200/74* (2013.01); *G01G 15/001* (2013.01); *G01G 17/00* (2013.01)

(58) Field of Classification Search
CPC .... B07C 5/16; B07C 5/18–5/32; G01G 15/00; G01G 15/001; G01G 2015/002; G01G 2015/005; G01G 23/01; G01G 7/06; G01G 17/00; G01G 23/3707; A61J 3/074; A61J 2200/74

See application file for complete search history.

(56) References Cited

U.S. PATENT DOCUMENTS

| | | | | |
|---|---|---|---|---|
| 4,738,324 A | * | 4/1988 | Borchard ................. | G01G 3/08 177/210 C |
| 5,249,689 A | * | 10/1993 | Wergeland ............. | B30B 9/322 100/902 |
| 5,515,740 A | * | 5/1996 | Gamberini ............. | A61J 3/074 177/119 |
| 5,750,938 A | * | 5/1998 | De Caris ................. | G01G 7/06 177/50 |
| 5,796,051 A | * | 8/1998 | Chiari ................. | G01G 15/001 177/119 |

(Continued)

FOREIGN PATENT DOCUMENTS

GB 2 269 354 A 2/1994
WO 2006/035285 4/2006

OTHER PUBLICATIONS

Italian Search Report Dated Apr. 9, 2014 for Corresponding Italian Application No. BO 2013A-000430.

*Primary Examiner* — Randy W Gibson
(74) *Attorney, Agent, or Firm* — Gottlieb, Rackman & Reisman, P.C.

(57) ABSTRACT

A method and apparatus for weighing pharmaceutical product capsules, whereby a capsule containing a pharmaceutical product is fed into a pocket to allow a measuring device to determine the weight of the pharmaceutical product and of a first portion of the capsule containing the pharmaceutical product; the pocket, and therefore the capsule, then being inverted to move the pharmaceutical product out of the first portion and into a second portion of the capsule, to allow the measuring device to determine the weight of the first portion only of the capsule.

19 Claims, 5 Drawing Sheets

(56) References Cited

U.S. PATENT DOCUMENTS

| | | | | |
|---|---|---|---|---|
| 6,478,162 B1* | 11/2002 | Yamamoto | ............... | B07C 5/16 177/105 |
| 6,877,611 B2* | 4/2005 | Yamamoto | ............... | B07C 5/18 209/592 |
| 7,694,497 B2* | 4/2010 | Tagliavini | ............... | A61J 3/074 53/452 |

* cited by examiner

APPARATUS FOR WEIGHING PHARMACEUTICAL PRODUCT CAPSULES

This application claims priority from Italian Application Serial No. BO 2013A 000430 filed Aug. 1, 2013 and incorporated herein by reference.

The present invention relates to an apparatus for weighing pharmaceutical product capsules.

BACKGROUND OF THE INVENTION

In the pharmaceutical industry, machines are used for filling capsules with pharmaceutical products.

Once filled, the capsules are transferred to weighing apparatus comprising a number of pockets, each for receiving and retaining a respective capsule.

The weighing apparatus also comprises a weighing system, in turn comprising, for each pocket, a measuring device for determining the weight of the capsule and the pharmaceutical product inside it.

The weighing system also comprises a processing unit for calculating the weight of the pharmaceutical product alone as the difference between the value measured by the measuring device, and a nominal value representing the weight of an empty capsule.

Since the nominal empty capsule weight value memorized in the processing unit of the weighing system is a theoretical value, and the actual weight of each empty capsule actually varies within a range comprising the nominal value, known apparatuses of the above type for weighing pharmaceutical product capsules are relatively inaccurate.

Very often, the actual weight of the pharmaceutical product inside each capsule may even differ from the theoretical weight calculated by the weighing system on the basis of the nominal empty capsule weight value.

SUMMARY OF THE INVENTION

It is an object of the present invention to provide an apparatus for weighing pharmaceutical product capsules, designed to eliminate the above drawbacks and which is cheap and easy to produce.

According to the present invention, there is provided an apparatus for weighing pharmaceutical product capsules, as claimed in Claims 1 to 12.

The present invention also relates to a method of weighing pharmaceutical product capsules.

According to the present invention, there is provided a method of weighing pharmaceutical product capsules, as claimed in Claims 13 and 14.

BRIEF DESCRIPTION OF THE DRAWINGS

A non-limiting embodiment of the present invention will be described by way of example with reference to the attached drawings, in which.

DETAILED DESCRIPTION OF THE INVENTION

Figure 1:
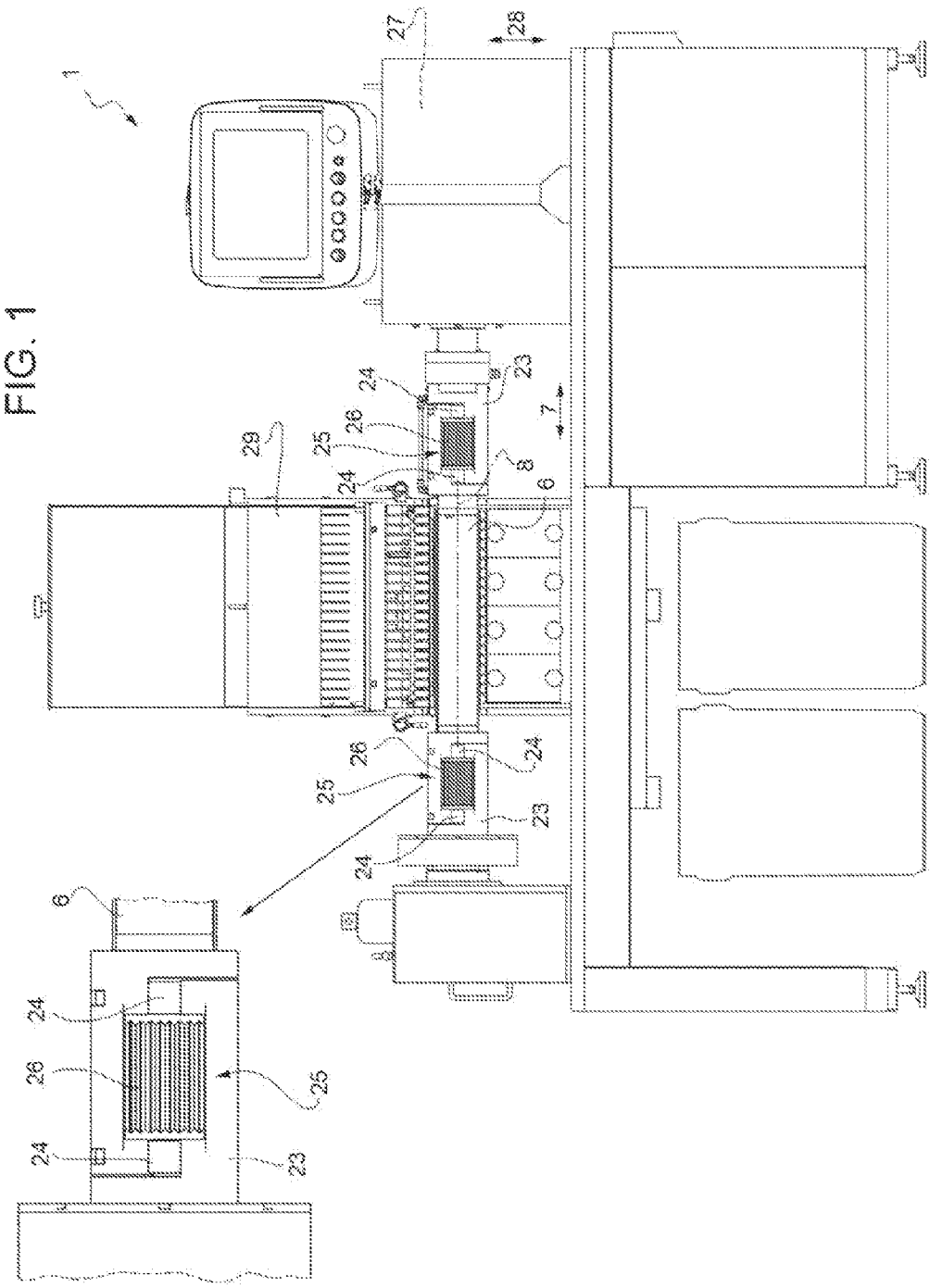
FIG. 1 shows a schematic front view, with parts removed for clarity, of a preferred embodiment of the apparatus according to the present invention.
Figure 3A:
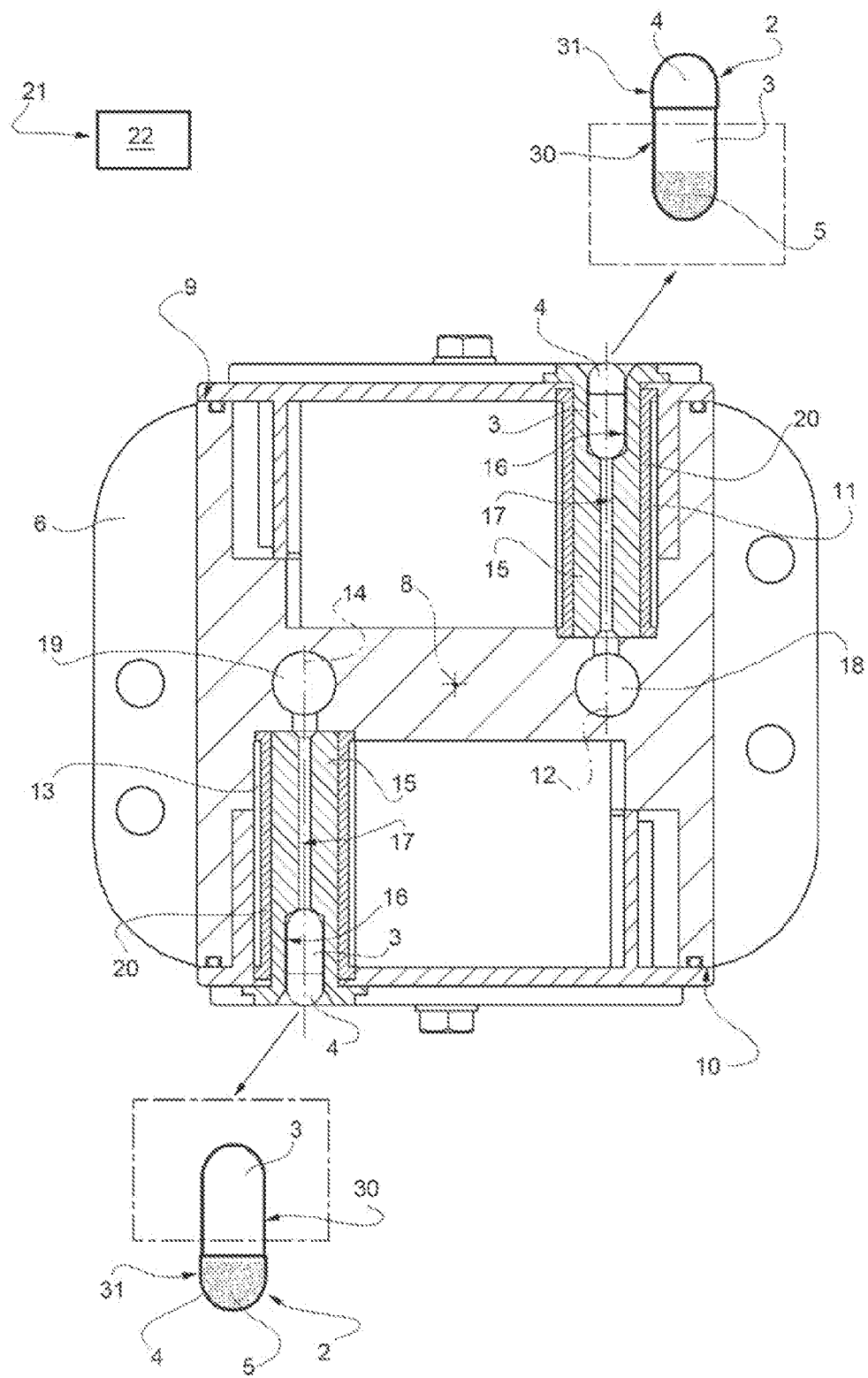
FIGS. 3a and 3b show two schematic cross sections, with enlarged details and with parts removed for clarity, of a first detail in FIG. 2 in two different operating positions.
Figure 3B:
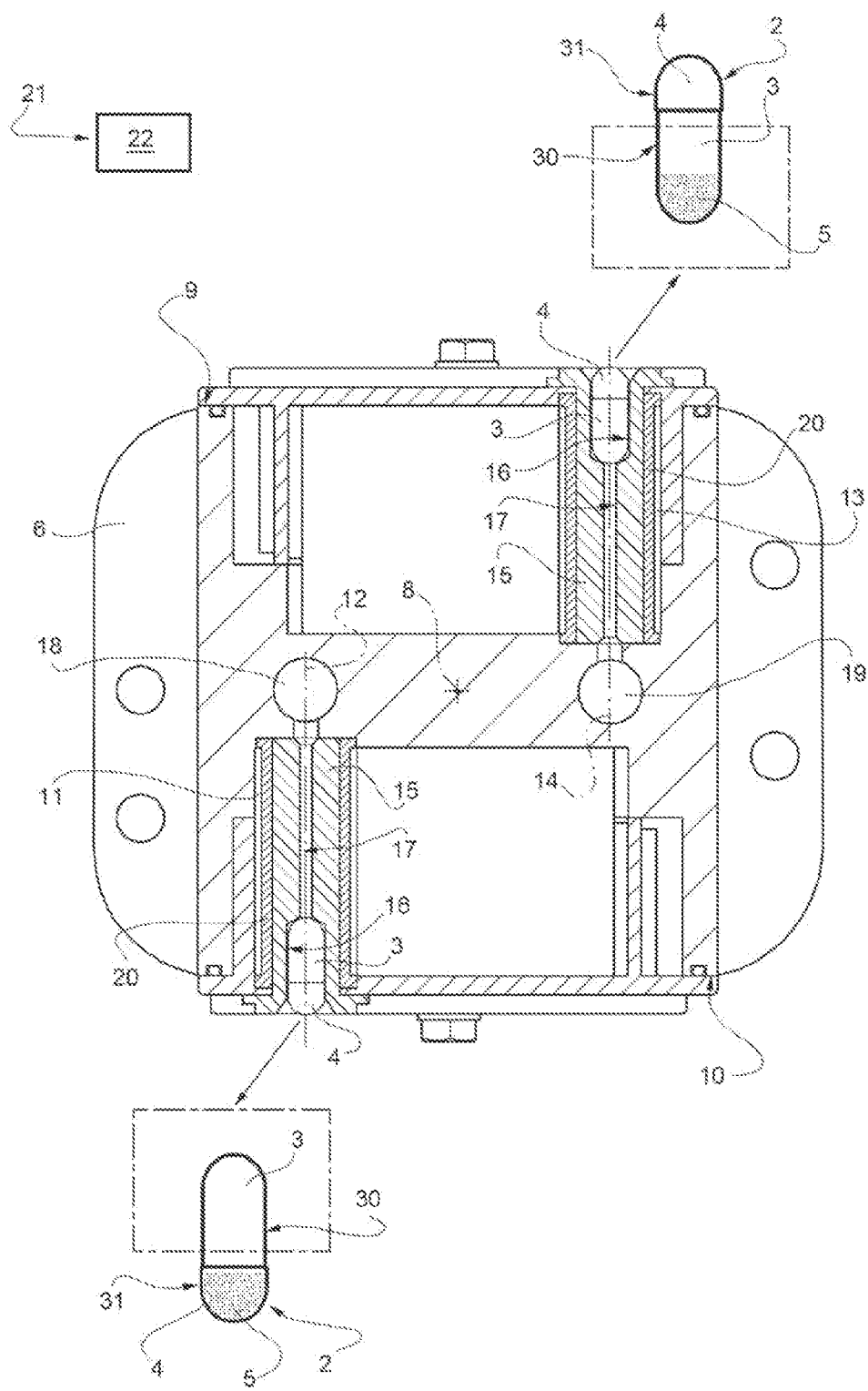

With reference to FIGS. 1, 3a and 3b, number 1 indicates as a whole an apparatus for weighing capsules 2, each of which comprises a bottom shell 3, and a top shell 4 closing bottom shell 3, and contains a pharmaceutical product 5, in particular in the form of powder or granules, of a smaller volume than capsule 2.

Apparatus 1 comprises an elongated weighing bar 6 which extends in a horizontal direction 7 and has a longitudinal axis 8 parallel to direction 7.

Bar 6 is parallelepiped shaped with a substantially rectangular cross section, and is bounded by two opposite, parallel lateral faces 9, 10.

Bar 6 comprises a first set of pockets 11, which are aligned in direction 7, open outwards at face 9, and have respective longitudinal axes 12 crosswise to axis 8 and perpendicular to face 9.

Bar 6 comprises a second set of pockets 13, which are aligned in direction 7, open outwards at face 10, and have respective longitudinal axes 14 parallel to axes 12 and perpendicular to face 10.

Pockets 13 are oriented with their concavities facing the opposite way to those of pockets 11, and are located on the opposite side to pockets 11 with respect to a longitudinal plane of symmetry, perpendicular to faces 9 and 10, of bar 6.

Each pocket 11, 13 is bounded laterally by a cylindrical bushing 15 which is fitted inside pocket 11, 13, coaxially with relative axis 12, 14, and comprises a wide portion 16 for receiving and retaining a capsule 2, and a narrow portion 17.

Bar 6 also has two air manifolds 18, 19 formed through bar 6 and parallel to direction 7; manifold 18 communicates with portions 17 of bushings 15 of pockets 11; and manifold 19 communicates with portions 17 of bushings 15 of pockets 13.

Each pocket 11, 13 has a capacitive transducer 20 integrated in relative bushing 15 and which, together with capacitive transducers 20 of the other bushings 15, forms part of a weighing system 21 also comprising a processing unit 22 connected to capacitive transducers 20.

Bushings 15 and capacitive transducers 20 are described and illustrated in the Applicant's Patent Application WO-2006/035285-A2, the content of which is included as a whole in the present patent application.

Each free end of bar 6 is connected to a respective rotary supporting arm 23 with the interposition of two shock-absorbing devices 24 mounted crosswise to direction 7.

Shock-absorbing devices 24 allow two vibrating devices 25 to shake bar 6, pockets 11, 13, and therefore capsules 2 housed inside the pockets 11, 13, as described more clearly below.

Each device 25 comprises an electromagnet 26, which is interposed between a relative free end of bar 6 and a relative arm 23, and which is designed to vibrate bar 6 according to a given law of motion.

Bar 6, arms 23, shock-absorbing devices 24 and vibrating devices 25 are moved as a whole intermittently about axis 8 by an actuating device—in the example shown, an electric motor—connected to one of arms 23.

Pockets 11, 13 in each set of pockets 11, 13 are moved back and forth between a first operating position, in which the concavities of pockets 11, 13 face upwards with relative axes 12, 14 parallel, to a vertical direction 28 crosswise to direction 7, and a second operating position, in which the concavities of pockets 11, 13 face downwards with relative axes 12, 14 parallel to direction 28.

In other words, pockets 11 are in the first operating position when pockets 13 are in the second operating position (FIG. 3a), and pockets 13 are in the first operating position when pockets 11 are in the second operating position (FIG. 3b).

Apparatus 1 also comprises a known hopper 29 mounted over bar 6 and designed to feed a capsule 2, oriented in the example shown with top shell 4 on top of bottom shell 3, into each pocket 11, 13 in the set of pockets 11, 13 in the first operating position.

Operation of apparatus 1 will now be described with reference to FIGS. 2, 3a, 3b and 4, with reference to pockets 11 only, and as of the instant in which:

pockets 11 are in the first operating position (FIG. 3a);
hopper 29 releases a capsule 2 into each pocket 11; and
manifold 18 is connected to a pneumatic suction device (not shown) to retain capsules inside respective pockets 11.

Once capsules 2 are fed into pockets 11, the two electromagnets 26 are activated to shake pockets 11, detach the pharmaceutical product 5 from the lateral walls of capsules 2, and ensure all the pharmaceutical product 5 settles at the bottom of capsules 2.

At this point, the two electromagnets 26 are deactivated, and capacitive transducer 20 of each pocket 11 determines the weight of relative pharmaceutical product 5, and of a first portion 30 of relative capsule 2, which contains pharmaceutical product 5 and is of at least the same volume as pharmaceutical product 5 (in the example shown, the volume of first portion 30 over-approximates the volume of pharmaceutical product 5).

Next, bar 6 is rotated about axis 8 by actuating device 27 to move pockets 11 into the second operating position (FIG. 3b); and the two electromagnets 26 are activated to shake pockets 11, detach pharmaceutical product 5 from the lateral walls of capsules 2, and ensure all the pharmaceutical product 5 settles at the bottom of capsules 2.

By rotating bar 6 and activating the two electromagnets 26, the pharmaceutical product 5 in each capsule 2 drops by gravity into a second portion 31 of capsule 2, which is of at least the same volume as pharmaceutical product 5, so as to completely empty the corresponding first portion 30.

At this point, the two electromagnets 26 are deactivated, and capacitive transducer 20 of each pocket 11 determines the weight of first portion 30 of relative capsule 2 only.

Finally, processing unit 22 calculates the difference between the first value measured by each capacitive transducer 20 with pockets 11 in the first operating position, and the second value measured by each capacitive transducer 20 with pockets 11 in the second operating position, so as to determine with absolute precision the net weight of pharmaceutical product 5 inside each capsule 2.

Figure 2:
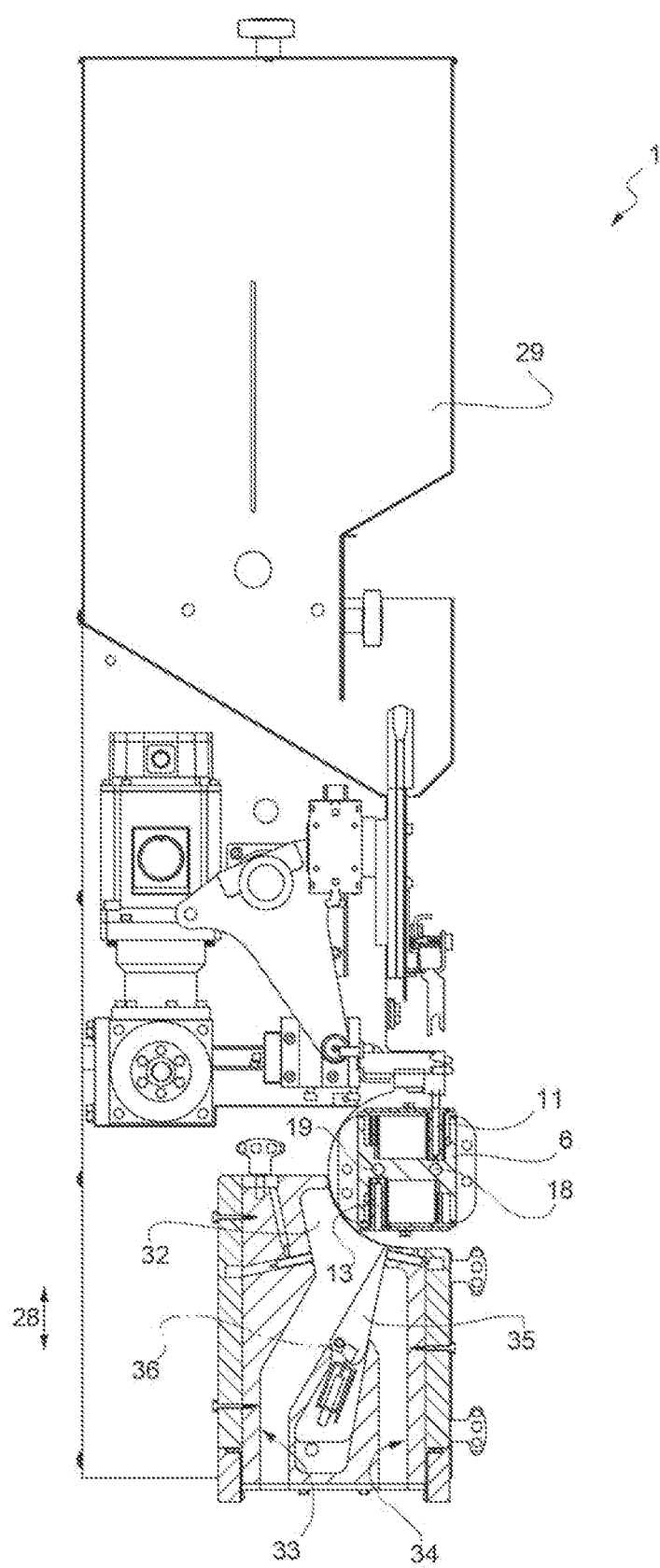
FIG. 2 shows a schematic, partly sectioned side view, with parts removed for clarity, of a detail of the FIG. 1 apparatus.
Figure 4:
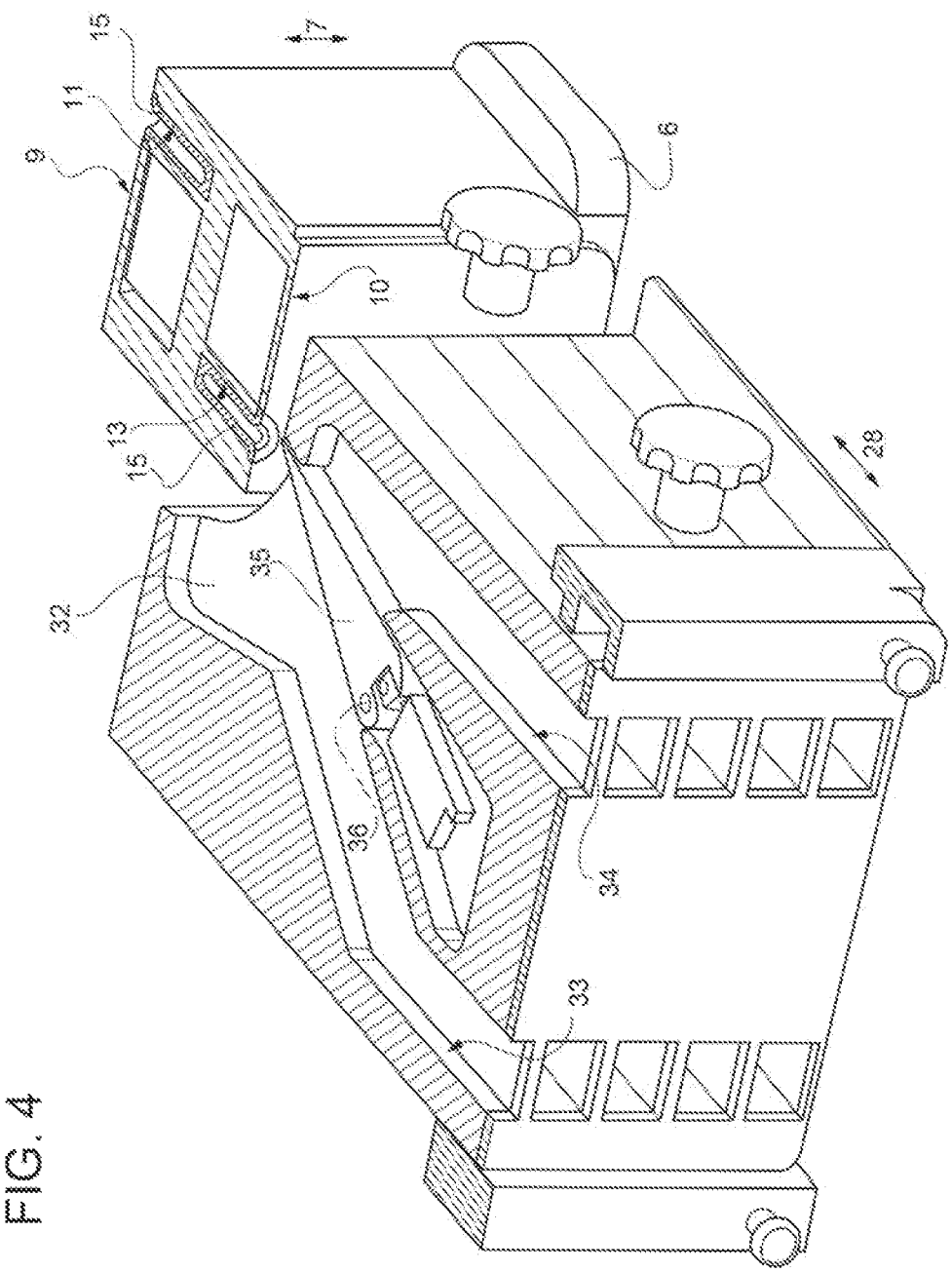
FIG. 4 shows a schematic, partly sectioned view in perspective of a second detail in FIG. 2.

With reference to FIGS. 2 and 4, manifold 18 is disconnected from the pneumatic suction device and connected to a pneumatic compressed-air device (not shown) to transfer each capsule 2 from relative pocket 11 to a relative unloading conduit 32 extending beneath bar 6 and comprising two outlet channels 33, 34.

In response to a signal from processing unit 22, each capsule 2 is fed selectively into one of the two channels 33, 34 by a diverting device 35 mounted to rotate, about a hinge axis 36 parallel to direction 7, between a first operating position (FIGS. 2 and 4), in which diverting device 35 opens channel 33 and closes channel 34, and a second operating position (not shown), in which diverting device 35 opens channel 34 and closes channel 33.

In other words, when the weight of pharmaceutical product 5 calculated by processing unit 22 equals a threshold value or falls within a given range, capsule 2 is fed along conduit 33; and conversely, when the weight of pharmaceutical product 5 calculated by processing unit 22 differs from the threshold value or does not fall within said given range, capsule 2 is fed along conduit 34 and rejected.

Apparatus 1 is highly precise, by virtue of weighing system 21 determining both the actual weight of pharmaceutical product 5 and first portion 30 of capsule 2 (i.e. the gross weight), and the actual weight of first portion 30 of capsule 2 only (i.e. the tare), and calculating the actual weight of pharmaceutical product 5 inside capsule 2 (i.e. the net weight) as the difference between the two measurements.

In other words, the actual weight of pharmaceutical product 5 inside each capsule 2 is calculated as the difference between two actual weights, both measured by capacitive transducer 20, as opposed to the difference between an actual weight measured by capacitive transducer 20 and a nominal weight (the weight of capsule 2) memorized in processing unit 22.

Obviously, in variations not shown:

each capsule 2 may be transferred from hopper 29 into relative pocket 11, 13 with top shell 4 beneath bottom shell 3;

each capsule 2 may be oriented inside relative pocket 11, 13 to allow weighing system 21 to weigh pharmaceutical product 5 and second portion 31 first, and then weigh second portion 31 only.

The invention claimed is:

1. An apparatus for weighing pharmaceutical product capsules (2), the apparatus comprising at least one pocket (11, 13) for receiving and retaining a capsule (2) containing a pharmaceutical product (5); and a weighing system (21) for weighing the pharmaceutical product (5) contained in the capsule (2); and being characterized in that the pocket (11, 13) is mounted to move between a first operating position, in which the pharmaceutical product (5) is housed inside a first portion (30) of the capsule (2), and a second operating position, in which the pocket (11, 13) and therefore the capsule (2) are inverted to move the pharmaceutical product out of the first portion (30) and into a second portion (31) of the capsule (2); the weighing system (21) comprising a measuring device (20) for determining the weight of the first portion (30) of the capsule (2) and of the pharmaceutical product (5), when the pocket (11, 13) is in the first operating position, and for determining the weight of the first portion (30) of the capsule (2) alone, when the pocket (11, 13) is in the second operating position, the apparatus also comprising at least one vibrating device (25) for shaking the pocket (11, 13) in at least one of said first and second operating positions.

2. An apparatus as claimed in claim 1, wherein the weighing system (21) also comprises a processing unit (22) for calculating the weight of the pharmaceutical product (5) alone as the difference between the two values measured by the measuring device (20).

3. An apparatus as claimed in claim 2, and also comprising two outlet channels (33, 34) for receiving the capsule (2) from the pocket (11, 13); and a diverting device (35) for feeding the capsule (2) selectively into one of the two outlet channels (33, 34) in response to a signal from the processing unit (22).

4. An apparatus as claimed in claim 1, and also comprising an elongated weighing bar (6) extending in a given direction (7) and having at least a first set of pockets (11)

aligned in said direction (7) and each for receiving and retaining a respective capsule (2).

5. An apparatus as claimed in claim 4, and also comprising a hopper (29) mounted over the weighing bar (6) to feed the capsules (2) into the relative pockets (11); the weighing bar (6) being mounted to rotate about an axis of rotation (8) parallel to said direction (7), and to move the pockets (11) between the first operating position, in which the pockets (11) are positioned with their concavities facing upwards to receive the capsules (2) from the hopper (29), and the second operating position, in which the pockets (11) are positioned with their concavities facing downwards.

6. An apparatus as claimed in claim 4, and also comprising an actuating device (27) for moving the weighing bar (6) about an axis of rotation (8) parallel to said direction (7); and at least one vibrating device (25) interposed between the actuating device (27) and the weighing bar (6) to shake each pocket (11) in at least one of said first and second operating positions.

7. An apparatus as claimed in claim 4, wherein the weighing bar (6) has a second set of pockets (13) with their concavities oriented the opposite way to those of the pockets (11) in the first set of pockets (11).

8. An apparatus as claimed in claim 4, wherein the weighing system (21) comprises a respective said measuring device (20) for each pocket (11, 13).

9. An apparatus as claimed in claim 1, wherein each measuring device (20) comprises at least one capacitive transducer.

10. An apparatus as claimed in claim 1, and also comprising a pneumatic suction device connectable to each said pocket (11, 13) when the pocket (11, 13) is moved between said first and second operating positions, and when the pocket (11, 13) is positioned in at least one of said first and second operating positions.

11. An apparatus as claimed in claim 1, and also comprising a pneumatic compressed-air device connectable to each said pocket (11, 13) when the pocket (11, 13) is in the second operating position.

12. An apparatus for weighing pharmaceutical product capsules (2), the apparatus comprising at least one pocket (11, 13) for receiving and retaining a capsule (2) containing a pharmaceutical product (5); and a weighing system (21) for weighing the pharmaceutical product (5) contained in the capsule (2); and being characterized in that the pocket (11, 13) is mounted to move between a first operating position, in which the pharmaceutical product (5) is housed inside a first portion (30) of the capsule (2), and a second operating position, in which the pocket (11, 13) and therefore the capsule (2) are inverted to move the pharmaceutical product out of the first portion (30) and into a second portion (31) of the capsule (2); the weighing system (21) comprising a measuring device (20) for determining the weight of the first portion (30) of the capsule (2) and of the pharmaceutical product (5), when the pocket (11, 13) is in the first operating position, and for determining the weight of the first portion (30) of the capsule (2) alone, when the pocket (11, 13) is in the second operating position, said apparatus also comprising an elongated weighing bar (6) extending in a given direction (7) and having at least a first set of pockets (11) aligned in said direction (7) and each for receiving and retaining a respective capsule (2), said apparatus further comprising a hopper (29) mounted over the weighing bar (6) to feed the capsules (2) into the relative pockets (11); the weighing bar (6) being mounted to rotate about an axis of rotation (8) parallel to said direction (7), and to move the pockets (11) between the first operating position, in which the pockets (11) are positioned with their concavities facing upwards to receive the capsules (2) from the hopper (29), and the second operating position, in which the pockets (11) are positioned with their concavities facing downwards.

13. An apparatus as claimed in claim 12, wherein the weighing system (21) also comprises a processing unit (22) for calculating the weight of the pharmaceutical product (5) alone as the difference between the two values measured by the measuring device (20).

14. An apparatus as claimed in claim 12, and also comprising an actuating device (27) for moving the weighing bar (6) about an axis of rotation (8) parallel to said direction (7); and at least one vibrating device (25) interposed between the actuating device (27) and the weighing bar (6) to shake each pocket (11) in at least one of said first and second operating positions.

15. An apparatus as claimed in claim 12, wherein the weighing bar (6) has a second set of pockets (13) with their concavities oriented the opposite way to those of the pockets (11) in the first set of pockets (11).

16. An apparatus as claimed in claim 12, wherein the weighing system (21) comprises a respective said measuring device (20) for each pocket (11, 13).

17. An apparatus as claimed in claim 12, wherein each measuring device (20) comprises at least one capacitive transducer.

18. An apparatus as claimed in claim 12, and also comprising a pneumatic suction device connectable to each said pocket (11, 13) when the pocket (11, 13) is moved between said first and second operating positions, and when the pocket (11, 13) is positioned in at least one of said first and second operating positions.

19. An apparatus as claimed in claim 1, and also comprising a pneumatic compressed-air device connectable to each said pocket (11, 13) when the pocket (11, 13) is in the second operating position.

* * * * *